(12) United States Patent
Ikeda

(10) Patent No.: US 6,310,284 B1
(45) Date of Patent: Oct. 30, 2001

(54) SHIELD-PLATED CORRUGATED TUBE

(75) Inventor: Tomohiro Ikeda, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 198 days.

(21) Appl. No.: 08/837,350

(22) Filed: Apr. 17, 1997

(30) Foreign Application Priority Data

May 7, 1996 (JP) .................................................. 8-112575

(51) Int. Cl.$^7$ ...................................................... H05K 9/00
(52) U.S. Cl. ...................... 174/35 R; 138/121; 138/143; 138/173
(58) Field of Search ................................. 174/68.1, 68.2, 174/35 R, 35 MS; 138/121, 122, 172, 173, 143; 428/35.8, 35.9, 36.9, 36.91

(56) References Cited

U.S. PATENT DOCUMENTS 5,325,893 * 7/1994 Takagi et al. ........................ 138/143
5,660,899 * 8/1997 Rockney et al. .................... 428/34.7

FOREIGN PATENT DOCUMENTS

| 56-25919 | 3/1981 | (JP) | H02G/3/04 |
| 58-9025 | 1/1983 | (JP) | H02G/3/04 |
| 60-111322 | 7/1985 | (JP) | H02G/3/04 |
| 60-133697 | 9/1985 | (JP) . | |
| 406286053 | * 10/1994 | (JP) | B32B/15/08 |

* cited by examiner

Primary Examiner—Dean A. Reichard
Assistant Examiner—Hung V Ngo
(74) Attorney, Agent, or Firm—Sughrue, Mion, Zinn, Macpeak & Seas, PLLC

(57) ABSTRACT

A metal layer uniform in thickness is formed by electroless plating on both of inner and outer surfaces of a corrugated tube to thereby produce a shield-plated corrugated tube which has a satisfactory flexibility as well as a superior electromagnetically shielding effect. Specifically, in the corrugated tube of resin, at least the size and shape of groove portions inside the tube for forming the convex-concave portions of the tube wall are set to satisfy the condition of 0.5<D/W<1.6 where D represents the depth of each groove portion in the radial direction of the tube and W represents the width of each groove portion in the axial direction of the tube. The metal layers are formed on the inner and outer surfaces of the corrugated tube by electroless plating.

3 Claims, 4 Drawing Sheets

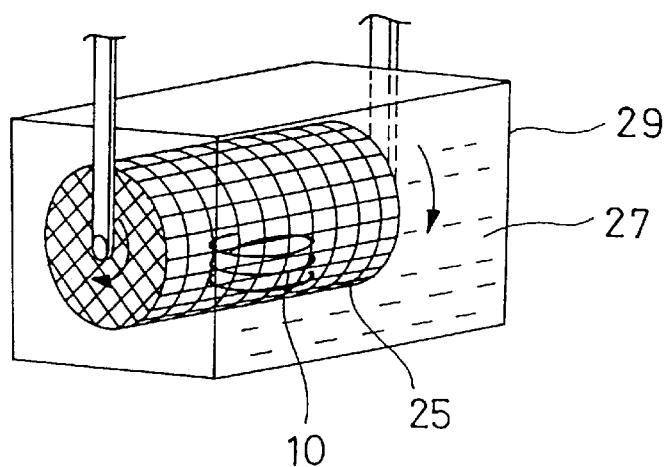
FIG. 5
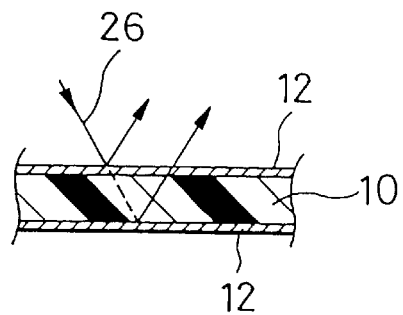
FIG. 6
FIG. 7
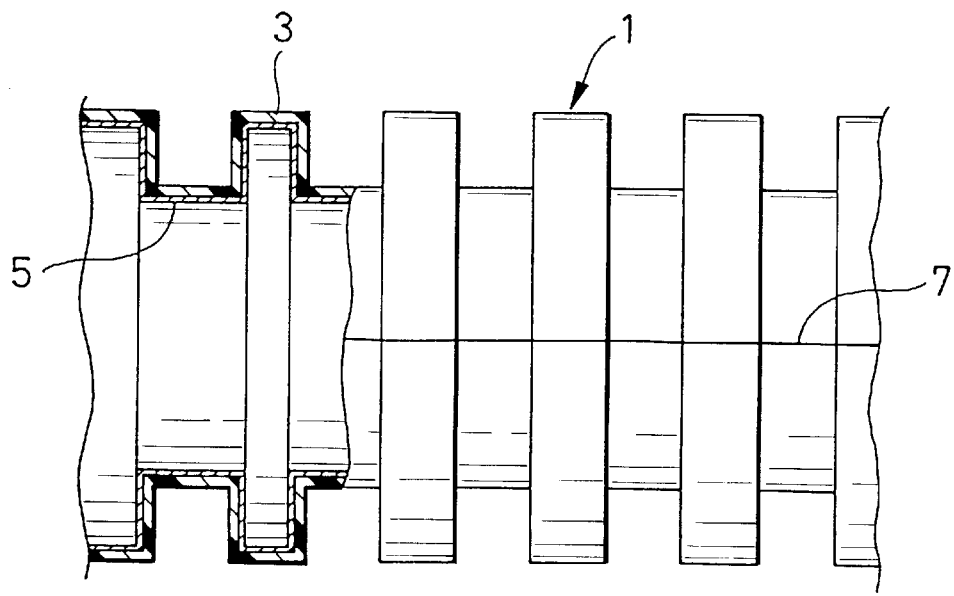

SHIELD-PLATED CORRUGATED TUBE

BACKGROUND OF THE INVENTION

1. Field of the Invention

This invention relates to a shield-plated corrugated tube, and particularly to a shield-plated corrugated tube which has a tube wall corrugated by repeating convex-concave portions in the axial direction of the tube to thereby be flexible, and which is designed to cover a bundle of electric wires or the like to perform mechanical protection and electromagnetic shielding of the bundle of electric wires or the like accommodated therein.

2. Background

Recently, controllers for cars, machine tools, office machines, etc. have been made with electronics, and countermeasure of these electronic equipments against electromagnetic-wave noise has become a serious problem. In the electronic equipments, wires connected thereto are apt to absorb electromagnetic-wave noise, so it is necessary to have a shield-countermeasure to shield internal conductors of the wires from external electromagnetic waves. Shielding the internal conductors is performed by grounding external conductors covering the internal conductors.

One of the external conductors used in this occasion is a shield-plated corrugated tube in which plating is applied on a flexible and bellows like tube (corrugated tube) made from resin material. The shield-plated corrugated tube is obtained by plating a corrugated tube, originally used as a wiring protector, in order to make the corrugated tube also have a shielding effect. In the shield-plated corrugated tube, a slit for insertion of wires is formed in the axial direction (longitudinal direction) of the tube in the same manner as in a conventional corrugated tube.

FIG. 7 shows a structural example of such a conventional shield corrugated tube.

In this shield corrugated tube 1, an electromagnetically shielding metal layer 5 is provided on the inner surface of a corrugated tube 3 formed from insulating resin material and having flexibility.

As illustrated, the corrugated tube 3 has a structure in which a tube wall is formed into a corrugated (bellows-like) shape so as to repeat predetermined convex-concave portions in the axial direction of the tube, and which has a slit 7 parting the tube wall in the axial direction of the tube. If the slit 7 is opened and the corrugated tube 7 is made to cover a bundle of electric wires or the like, the bundle of electric wires or the like can be accommodated therein easily, and mechanical protection and electromagnetic shielding of the accommodated bundle of electric wires or the like can be attained.

Examples of the method of providing such a metal layer include a method in which a corrugated pipe formed of metal is used as the metal layer, and the surface of the metal pipe is coated with an insulating resin layer; a method in which metal such as aluminum is evaporated onto a corrugated tube which has been made from insulating resin in advance; a method in which an electrically conductive paint is applied onto on a corrugated tube which has been made from insulating resin in advance; and so on.

However, in the above mentioned method using a metal pipe, it is difficult to form a coating of an insulating resin layer, so that there arise a problem that the cost is increased, and a problem that the flexibility is poor.

In the method by using evaporation, since it is impossible to make the metal layer thick, it is difficult to make the performance of shielding high. In addition, since there occurs a difference in the thickness of the metal layer between the vertical surface and the horizontal surface in the convex-concave portions, there arises a problem with the unstable shielding performance.

In the method in which electrically conductive coating is applied in the form of paint, it is difficult to perform uniform application of paint, so that there is a problem of unstable shielding performance further this method is not suitable for manufacturing a long shielded corrugated tube.

Electromagnetic shielding is attained by the electromagnetic wave reflection and absorption functions of a metal layer. However, in each of the above-mentioned methods, a thin metal layer can be formed on only either one of the inner and outer surfaces of a corrugated tube, and particularly the effect of reflection can be obtained only once by one sheet of the thin metal layer. Accordingly, there is a basic problem that it is difficult to obtain a sufficient electromagnetically shielding effect.

Under such a background, it has been therefore considered that such metal layers are formed on both the inner and outer surfaces of a corrugated tube made from insulating resin by employing the method of electroless plating. However, in the case where the electroless plating method is employed, bubbles generated during a plating process are collected in concave portions in the corrugated tube, or a plating solution remains, so that it is easy to produce a failure in plating.

Therefore, it is regarded as a problem to be solved in the future to prevent bubbles from being collected in concave portions in the corrugated tube during a plating process, to prevent a plating solution from remaining, and so on.

SUMMARY OF THE INVENTION

It is therefore an object of the present invention to solve the foregoing problems.

It is another object of the present invention to provide a shield-plated corrugated tube in which metal layers uniform in thickness can be formed on both the inner and outer surfaces of a corrugated tube by employing an electroless plating method, a superior electromagnetically shielding effect can be obtained by the metal layers formed on both the inner and outer surfaces of the corrugated tube, and the flexibility which is important in handling can be ensured satisfactorily.

In order to attain the foregoing objects, according to the present invention, provided is a shield-plated corrugated tube for covering a bundle of electric wires or the like to mechanically protect and electromagnetically shield the bundle of electric wires or the like accommodated therein, including: a flexible corrugated tube formed from insulating resin material so as to have a tube wall which is corrugated by repetition of predetermined convex-concave portions in an axial direction of the tube; and an electromagnetic shielding metal layer disposed on a surface of the corrugated tube, in which the size of the corrugated tube is set at least so that each of grooved portions for forming the convex-concave portions satisfies a condition of $0.5 < D/W < 1.6$ where D represents a depth of each groove in the radial direction of the tube, and W represents a width of each groove in the axial direction of the tube, and wherein the metal layer is formed by electroless plating on each of inner and outer surfaces of the corrugated tube.

According to the study of the inventor of the present application, it was made clear that whether bubbles generated in a plating process are apt to be collected in concave portions in the corrugated tube or not shows a close relation with the shape of grooved portions inside the tube for forming convex-concave portions which make the tube wall of the corrugated tube wavy when the metal layers are formed on both the inner and outer surfaces of the corrugated tube by an electroless plating method.

For example, in the grooved portions inside the tube for forming the convex-concave surfaces, assume that the depth of each groove in the radial direction of the tube is D, and that the width of the groove in the axial direction of the tube is W. Then, if the value of D/W was 1.5 or less, no accumulation of bubbles was detected in all the examined samples, and when the value of D/W was 1.6, one accumulation of bubbles was detected in ⅓ of the samples. When the value of D/W was 1.7 or more, there was such a tendency that the number of generated accumulations of bubbles was increased suddenly.

In addition, the inventor of the present application inquired the correlation between the above-mentioned value of D/W and the flexibility of the corrugated tube with respect to corrugated tubes of various nominal diameters. As a result, it was found that when the value of D/W is 0.5 or less, a large bending radius R is required, and the flexibility is lowered.

Therefore, when a corrugated tube is set at least so that grooved portions inside the tube formed into a shape having an approximately rectangular section and satisfying 0.5<D/W<1.6 as in a shield-plated corrugated tube according to the present invention, no accumulation of bubbles is generated in an electroless plating process, and metal layers uniform in thickness can be formed on both the inner and outer surfaces of the corrugated tube, so that a superior electromagnetically shielding effect can be obtained by the metal layers formed on both the inner and outer surfaces of the corrugated tube. Further, it is possible to ensure satisfactory flexibility which is important in handling.

BRIEF DESCRIPTION OF THE DRAWINGS

FIG. 5 is a schematic diagram showing a method of handling a corrugated tube in electroless plating applied to the present invention;

FIG. 6 is a sectional view of a shield-plated corrugated tube, for explaining the electromagnetic-wave reflection and absorption effects of the tube; and FIG. 7 is a partially broken sectional view of a conventional shielded corrugated tube.

DETAILED DESCRIPTION OF THE PREFERRED EMBODIMENT

A preferred embodiment of a shield-plated corrugated tube according to the present invention will be described below with reference to the drawings.

Figure 1:
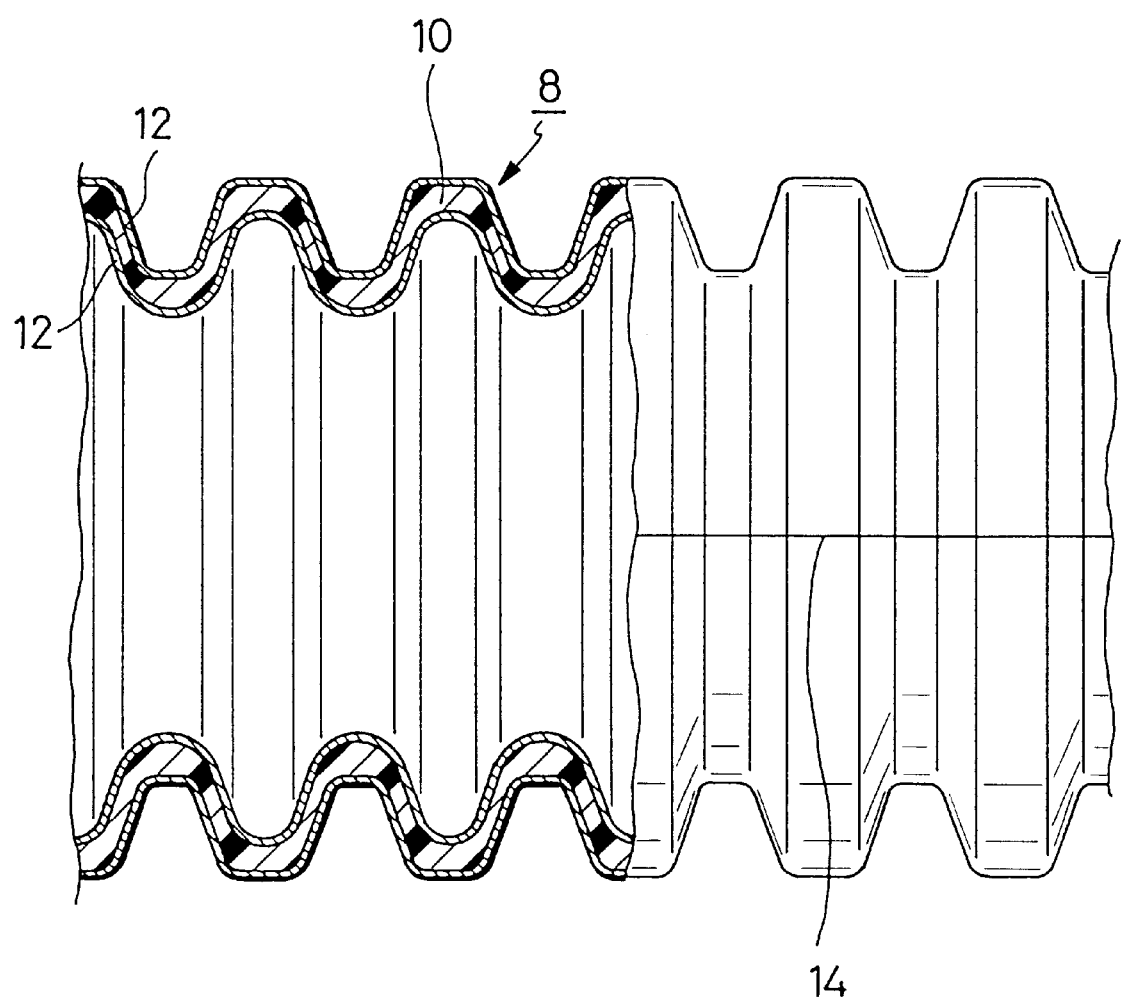
FIG. 1 is a partially cut away view of a shield-plated corrugated tube according to the present invention.

As shown in FIG. 1, in a shield-plated corrugated tube 8, electromagnetically shielding metal layers 12 are provided, by an electroless plating method, on the inner and outer surfaces of a corrugated tube 10 formed of insulating resin material having flexibility.

Figure 2:
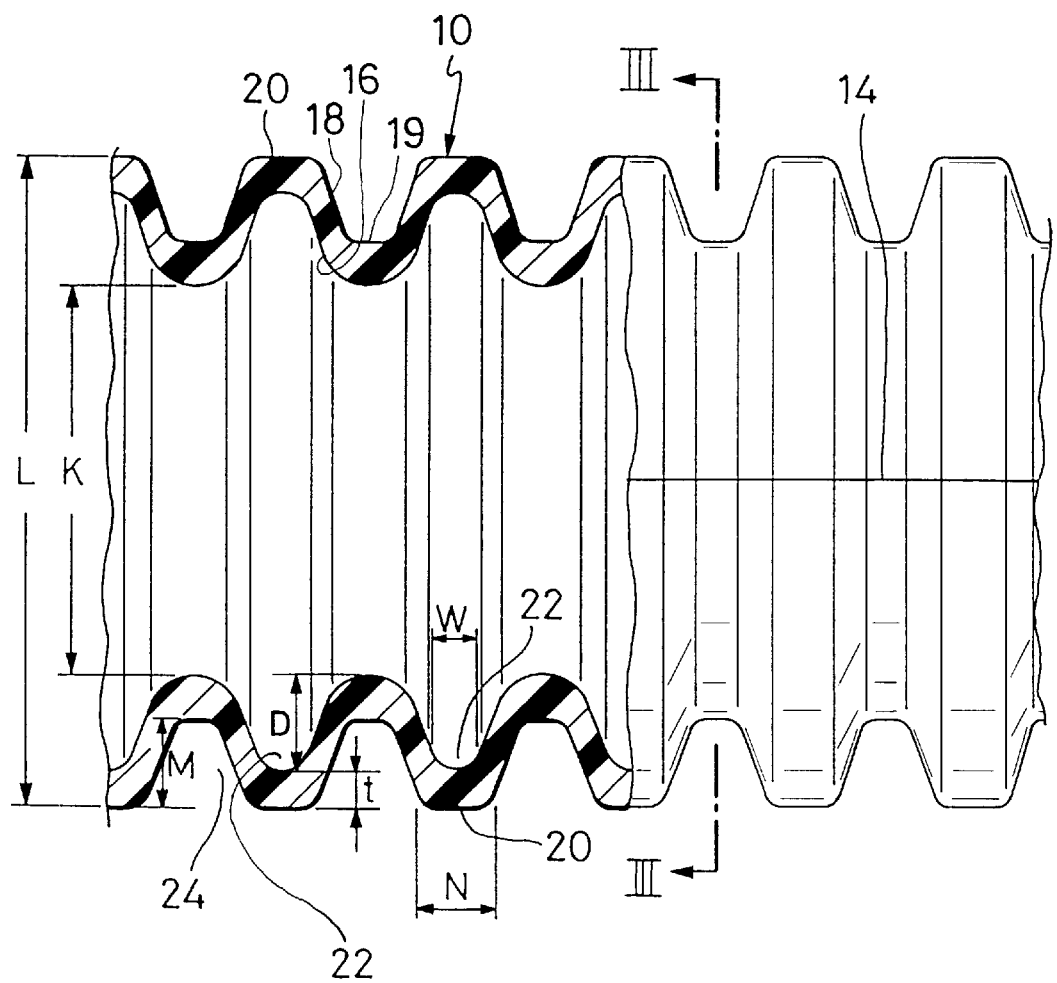
FIG. 2 is a partially cut away view of a corrugated tube as a base material of the shield-plated corrugated tube according to the present invention.
Figure 3:
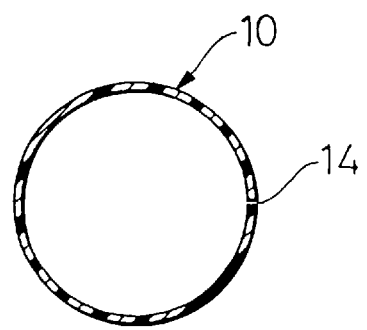
FIG. 3 is a sectional view taken on line III—III in FIG. 2.

As also shown in FIGS. 2 and 3, the corrugated tube 10 has a structure in which a tube wall is formed into a corrugated shape by repeating predetermined convex-concave portions in the axial direction of the tube, and which has a slit 14 parting the tube wall in the axial direction of the tube, so that the corrugated tube 10 can easily accommodate a bundle of electric wires or the like therein if the slit 14 is opened and the bundle of electric wires or the like are inserted in the tube.

Further, in this corrugated tube 10, when the depth of the groove in the radial direction of the tube is D and the width of the groove in the axial direction of the tube is W, the sizes of D and W are set at least to satisfy 0.5<D/W<1.6 in a grooved portion 22 inside the tube for forming the convex-concave portions of the tube wall.

When the corrugated tube 10 is formed from, for example, ABS resin, a series of steps of electroless plating shown in FIGS. 4A to 4I are performed sequentially, so as to form the above-mentioned metal layers 12.

That is, first, butadiene on ABS resin is melted, and etching is performed (FIG. 4A) to make an intaglio trace. After that, an etching solution is neutralized (FIG. 4B), and cleaning and conditioning by immersion into weak acid is performed (FIG. 4C).

Figure 4A:
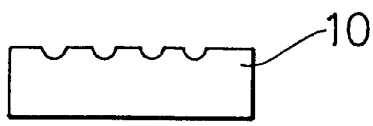
FIGS. 4A to 4I are explanatory diagrams showing a series of treatment procedures of electroless plating applied to the present invention.
Figure 4B:
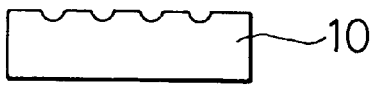
Figure 4C:
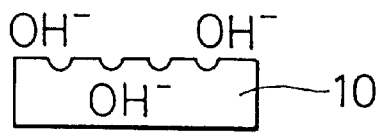
Figure 4D:
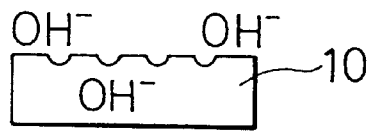
Figure 4E:
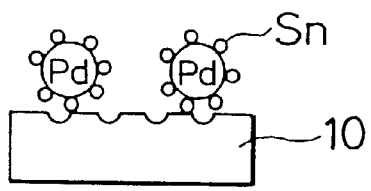
Figure 4F:
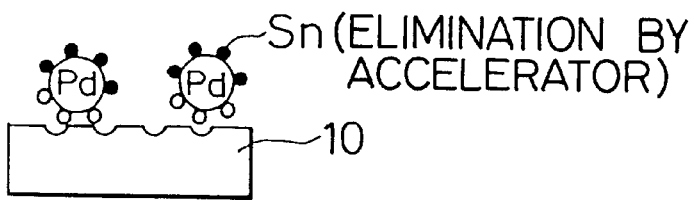

Next, after predip is performed (FIG. 4D), immersion into catalyst liquid for precipitating a colloidal substance of palladium and tin on the surface is performed (FIG. 4E), and activation for separating tin and leaving only palladium, that is, immersion into accelerator liquid is performed (FIG. 4F).

Figure 4G:
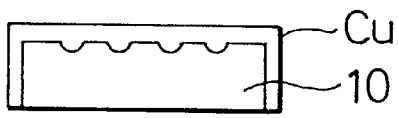
Figure 4H:
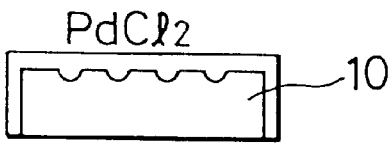
Figure 4I:
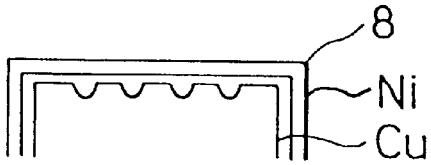

Next, after electroless copper plating is performed (FIG. 4G), the catalyst (palladium chloride) is absorbed (FIG. 4H). Finally, electroless nickel plating is performed (FIG. 4I), and the corrugated tube 10 is dried. Thus, the series of plating steps are completed.

Steps of water washing and treatment liquid recovery are inserted between the respective steps.

In addition, in the above-mentioned respective processes, as shown in FIG. 5, the corrugated tube 10 is put into a cylindrical wire mesh basket 25 in the state where the corrugated tube 10 is wound, and the corrugated tube 10 is immersed into a treatment liquid 27 stored in a plating tank 29 together with this wire mesh basket 25. The wire mesh basket 25 is vibrated or rotated while the corrugated tube 10 is immersed in the treatment liquid 27 or when it is put into or take a out of the treatment liquid 27.

Each of the metal layers 12 formed on both the inner and outer surfaces of the corrugated tube 10 by the above electroless plating steps has a laminated structure of a copper-foundation plating layer (0.8 to 1.6 $\mu$m thick) for electromagnetic shielding and a nickel plating layer (0.2 to 0.4 $\mu$m thick) formed on the copper plating layer for corrosion prevention.

In the above-mentioned electroless plating treatment, particularly air adhesion caused by failure in surface activation is apt to be generated in the etching step shown in FIG. 4A, and bubbles such as hydrogen gas are apt to be generated in the electroless copper plating step shown in FIG. 4G. The generated bubbles adhere to the surface of the corrugated tube 10 (particularly to the grooved portions of the convex-concave portions of the tube wall) to form an accumulation of bubbles to thereby cause plating failure.

A countermeasure against the adhesion of bubbles is therefore required. Generally, bubbles adhering to concave portions 24 (see FIG. 2) on the outer surface side of the corrugated tube 10 can be removed comparatively easily by giving vibrations, or the like, to the corrugated tube 10. However, it is difficult to remove bubbles adhering to concave portions on the inner surface side of the corrugated tube 10 by giving vibrations, or the like, to the corrugated tube 10.

However, as the result of analysis by lots of experiments on the behavior of the bubbles adhering to the concave portions on the inner surface side of the corrugated tube, it was made clear that the ease of accumulation, in the concave portions in the corrugated tube, of the bubbles generated in a plating step shows a close correlation with the shape of the grooved portions 22 inside the tube for forming convex-concave portions of the tube wall of the corrugated tube, as mentioned above.

More specifically, the inventor of the present application inquired into the correlation between the value of D/W and the number of generated bubbles accumulated in the above-mentioned two steps where bubbles were apt to be generated, on the assumption that the depth of each groove in the radial direction of the tube is D, and the width of each groove in the axial direction of the tube is W.

The convex-concave portions of the tube wall of the corrugated tube 10 define an approximately sinusoidal smooth waveform on the inner surface 16 of the tube, while defining a partially transformed waveform leaving flat portions on bottom portion 19 and peak portions 20 on the outer surface 18 of the tube.

Because it was difficult to actually measure the values of D and W, for the sake of convenience, the outer diameter L and inner diameter (nominal diameter) K of the corrugated tube 10, the depth M of the concave portion 24 on the outer surface 18 side, the length N of flat portion of the peak portion 20, and so on, were actually measured, and the values D and W were obtained from these actually measured values on the basis of the following expressions (1) to (3).

$$D=M \quad (1)$$

$$t=\{(L-K)/2\}-M \quad (2)$$

$$W=N-2t \quad (3)$$

As a result, when the value of D/W was 1.5 or less, adhering bubbles were separated and discharged from the openings on the both sides of the tube or from the slit 14 only by giving slight vibrations to the corrugated tube during plating, and no accumulation of bubbles was detected in any sample. When the value D/W was 1.6, one accumulation of bubbles was detected in ⅓ of the examined samples even if vibrations were similarly given to the corrugated tube. When the value D/W was 1.7 or more, the tendency was a sudden increase of the number of generated accumulations of bubbles.

Such a tendency could be confirmed in the same manner in all the corrugated tubes available on the market and having various inner diameters (nominal diameters) which were in the range of from 7.4±0.4 mm to 32.4±0.6 mm.

In addition, although it was foreseen that ease of generation of bubble accumulation has a connection with the nominal diameter (the diameter of openings on the both sides) of a corrugated tube, the depth D of each groove was 15% or less of the nominal diameter K (see FIG. 2) (that is, D≦0.15K) in any of the examined corrugated tubes, and similar tendency was confirmed without any connection with the value of the nominal diameter if there was such a difference between the values D and K.

In addition, the inventor of the present application inquired into the correlation between the above-mentioned value D/W and the flexibility of the corrugated tubes 10 having various nominal diameters. As the result, it was made clear that when the value D/W was 0.5 or less, a large bending radius R was required and the flexibility was lowered.

From the above findings, at least if the grooved portions 22 inside the corrugated tube 10 are set to have an approximately rectangular section and to satisfy the condition of 0.5<D/W<1.6, no bubble accumulation is generated at the time of electroless plating, and the metal layers 12 having uniform thickness can be formed on both the inner and outer surfaces of the corrugated tube 10.

When the metal layers 12 are formed on both the inner and outer surfaces of the corrugated tube 10, these metal layers 12 on both the inner and outer surfaces exhibit effects to reflect and absorb an electromagnetic wave 26 as shown in FIG. 6 so that electromagnetic-wave noise is reflected twice and much superior effect of electromagnetic shielding can be exhibited in comparison with a conventional case where a metal layer is formed on either one of the inner and outer surfaces of a corrugated tube. Further, it is also possible to ensure a satisfactory flexibility which is important in handling.

Actually, a bundle of electric wires were covered with such a shield-plated corrugated tube manufactured in the above embodiment, and the electromagnetically shielding effect of the shield-plated corrugated tube was examined. As a result, it was confirmed that the shield-plated corrugated tube had a superior electromagnetically shielding effect, and it was proved that metal layers were well formed on the inner and outer surfaces of the corrugated tube. In addition, the bundle of wires covered with the shield-plated corrugated tube could be bent easily and it was confirmed that the shield-plated corrugated tube had a satisfactory flexibility.

Although the convex-concave portions of the tube wall of the corrugated tube are shaped into an approximate sine-curve in the above embodiment, the present invention is also applicable to the case where the convex-concave portions are rectangular, etc. as shown in FIG. 7.

Although only the size of grooved portions inside the corrugated tube is set so as to satisfy the condition of 0.5<D/W<1.6 in the above embodiment, the size of the concave portions of the outer surface of the corrugated tube may be set in the same manner to have enough size so that bubbles are separated easily. However, in the case of the outer surface, bubbles adhering thereto can be removed comparatively easily by vibrations or the like, and the countermeasure for such a problem is not so important.

Ease of accumulation of bubbles generated in a plating step or residual treatment liquid in each concave portion of the corrugated tube shows a close correlation with the shape of the grooved portions for forming the convex-concave portions of the tube wall of the corrugated tube in the case where metal layers are formed on both the inner and outer surfaces of the corrugated tube by an electroless plating method. In the grooved portions inside the tube for forming the convex-concave surfaces, assume that the depth of each groove in the radial direction of the tube is D, and that the width of the groove in the axial direction of the tube is W. Then, if the value of D/W was 1.5 or less, no accumulation of bubbles was detected in all the examined samples, and when the value of D/W was 1.6, one accumulation of bubbles was detected in ⅓ of the samples. When the value of D/W was 1.7 or more, there was such a tendency that the number of generated accumulations of bubbles was increased suddenly.

In addition, the inventor of the present application inquired into the correlation between the above-mentioned value of D/W and the flexibility of the corrugated tube with respect to corrugated tubes of various nominal diameters. As a result, it was found that when the value of D/W is 0.5 or less, a large bending radius R is required, and the flexibility is lowered.

Therefore, when a corrugated tube is set at least so that grooved portions inside the tube are formed into a shape having an approximately rectangular section and satisfying 0.5<D/W<1.6 as in a shield-plated corrugated tube according to the present invention, no accumulation of bubbles is generated in an electroless plating process, and metal layers uniform in thickness can be formed on both the inner and outer surfaces of the corrugated tube, so that a superior electromagnetically shielding effect can be obtained by the metal layers formed on both the inner and outer surfaces of the corrugated tube. Further, it is possible to ensure satisfactory flexibility which is important in handling.

What is claimed is:

1. A shield-plated corrugated tube, for covering an electric wire to mechanically protect and electromagnetically shield said electric wire accommodated therein, comprising:

a flexible tube body formed from insulating resin material, said tube body including a tube wall corrugated by repetition of convex-concave portions in an axial direction of said tube body, said convex-concave portions having a plurality of inner and outer grooved portions, wherein the size of said tube body is set at least so that each of said inner grooved portions satisfies a condition of $0.5 < D/W < 1.6$ where D represents a depth of each of said inner grooved portions in the radial direction of said tube body, and W represents a width of each of said inner grooved portions in the axial direction of said tube body; and an electromagnetic shielding metal layer formed on an inner surface of said tube wall of said tube body by electroless plating.

2. The shield-plated corrugated tube of claim 1, further comprising an electromagnetic shielding metal layer formed on an outer surface of said tube wall of said tube body.

3. The shield-plated corrugated tube of claim 1, wherein a relationship of the depth (D) of each of said inner grooved portions and an inner diameter (K) of said tube body satisfies the following formula:

$$D \leq 0.15K.$$

* * * * *